United States Patent [19]
Nakayama et al.

[11] Patent Number: 5,802,532
[45] Date of Patent: Sep. 1, 1998

[54] KERNING METHOD AND ELECTRONIC TYPOGRAPHIC/EDITING APPARATUS

[75] Inventors: Hiroshi Nakayama; Kiyotaka Miyai, both of Tokyo, Japan

[73] Assignee: Dainippon Screen Mfg. Co., Ltd., Kyoto, Japan

[21] Appl. No.: 676,509

[22] Filed: Jul. 8, 1996

[30] Foreign Application Priority Data

Jul. 10, 1995 [JP] Japan ................................. 7-198014

[51] Int. Cl.$^6$ ..................................................... G06T 1/00
[52] U.S. Cl. .......................... 707/519; 400/304; 345/467
[58] Field of Search ..................................... 345/144, 467; 707/519; 400/304

[56] References Cited

U.S. PATENT DOCUMENTS

| | | | |
|---|---|---|---|
| 5,432,890 | 7/1995 | Watanabe | 707/519 |
| 5,501,538 | 3/1996 | Sawada et al. | 400/304 |
| 5,590,247 | 12/1996 | Mikuni | 395/110 |
| 5,609,427 | 3/1997 | Takasawa et al. | 400/304 |
| 5,623,593 | 4/1997 | Spells, III | 345/472 |

*Primary Examiner*—Joseph H. Field
*Assistant Examiner*—Jae-Hee Choi
*Attorney, Agent, or Firm*—Nikaido, Marmelstein, Murray & Oram LLP

[57] ABSTRACT

A practical kerning method and electronic typo-graphic/editing apparatus which is capable of arranging characters such that two characters do not come too close to each other across a small character or sign included in a character string. In positioning an object character with a space reduction relative to an immediately preceding character, a space (character space) between the first character and the third character of three characters, for example, is determined after the three characters are arranged with successive space reductions. This first to third character facing space is checked to see if it is smaller than a reference space. When the first to third character facing space is smaller than the reference space, a correction is made to at least one of a space reduction amount for the second character and a space reduction amount for the third character. An excessive closeness between the first and third characters is prevented by slightly diminishing the space reduction amount for at least one character.

16 Claims, 14 Drawing Sheets

FIG.9

| |
|---|
| font name |
| character size |
| character code of 1st character M1 |
| character code of 2nd character M2 |
| reduction amount for 2nd character M2 |
| character code of 3rd character M3 |
| reduction amount for 3rd character M3 |
| ⋮ |
| character code of nth character Mn |
| reduction amount for nth character Mn |

FIG.14

| (CHARACTER POSITION) | CHARACTER | SPACE WIDTH |
|---|---|---|
| CENTER | . . ˆ ˙ ˋ ‥ — | FRONT SPACE A = REAR SPACE B |
| RIGHT SPACED | ヽ 。 ， 、 ˋ ° ´ | FRONT SPACE A < REAR SPACE B |
| RIGHT SPACED | ″ ˝ ″ | FRONT SPACE A < REAR SPACE B |
| LEFT SPACED | ` | FRONT SPACE A > REAR SPACE B |
| LEFT SPACED | " | FRONT SPACE A > REAR SPACE B |

*" ‥ " DENOTES VALUES OF Q1 AND Q2

FIG.15

| CHARACTER | Q1 | Q2 |
|---|---|---|
| CHARACTER A | ‥ | ‥ |
| CHARACTER B | ‥ | ‥ |
| CHARACTER C | ‥ | ‥ |
| CHARACTER D | ‥ | ‥ |
| ⋮ | ⋮ | ⋮ |
| CHARACTER N | ‥ | ‥ |
| ⋮ | ⋮ | ⋮ |

*" ‥‥ " DENOTES VALUES OF REDUCTION AMOUNT

FIG.16

| CHARACTER PAIR | REDUCTION AMOUNT |
|---|---|
| CHARACTERS A & B | ‥‥‥ |
| CHARACTERS C & D | ‥‥‥ |
| ⋮ | ⋮ |
| CHARACTERS M & N | ‥‥‥ |
| ⋮ | ⋮ |

5,802,532

KERNING METHOD AND ELECTRONIC TYPOGRAPHIC/EDITING APPARATUS

BACKGROUND OF THE INVENTION (1) Field of the Invention

The present invention relates to typefaces or fonts for typographic/editing apparatus used in desktop publishing (DTP) and the like. More particularly, the invention relates to a kerning method and electronic typographic/editing apparatus for reducing space between characters.

(2) Description of the Related Art

In the computer-based electronic typography today, characters handled by typographic/editing apparatus, regardless of the type of characters such as kana, kanji, etc., have faces fitting in frames of a predetermined size. First, components of a character will be described with reference to a schematic view shown in FIG. 18. As used in the following description, the term "characters" refers to numerals and varied signs as well as letters in a narrow sense (such as alphabets and the like) which are used in forming ordinary sentences and words.

The schematic view shows a makeup of kana "し", by way of example.

The configuration of the character is enclosed in an "imaginary body" IB which is a rectangular frame (character frame) representing a minimum character positioning unit. The imaginary body IB has a horizontal length X providing a "character width", and a vertical length Y providing a "character height". Generally, the character width X and the character height Y have the same value.

The imaginary body IB includes a "face" F placed therein which represents a configuration of a character. The face F is composed of dot data based on a combination of dots, or vector data mathematically depicting a shape. The face F has an outermost contour thereof enclosed in a rectangular frame called bounding box (face frame) BB. The bounding box BB has a horizontal length W providing a "face width", and a vertical length H providing a "face height". A comination of face width W and face height H is referred to hereinafter as a face size.

As shown, the difference (space width) between the face width W of the face F disposed inside the imaginary body IB and the character width X of the imaginary body IB provides a front space "a" and a rear space "b". The difference between the face height H and the character height Y provides an upper space "c" and a lower space "d". These spaces are variable with the size and shape of face F enclosed in the imaginary body IB, i.e. variable from character to character.

The bounding box BB sometimes refers to a rectangular frame including suitable margins (side bearings) around the face F. In the following description, the bounding box is regarded as including no such side bearings unless otherwise noted. In the case of the European alphabets, usually, the spaces "a" to "d" are not provided between the imaginary body and bounding box (that is, the imaginary body is identical to the bounding box). However, for expediency of description, the spaces "a" to "d" are regarded as being provided for the European alphabets also. This poses no inconvenience in understanding the present invention since the spaces "a" to "d" may be described as zero if no such spaces are provided.

In arranging characters of a character string in a predetermined direction, an object character may be positionally adjusted or kerned relative to an adjacent reference character already fixed in place. In a most typical example of such kerning methods (which is called a pair kerning method), space reduction amounts for predetermined character pairs are provided in the form of a table, a space reduction amount for each pair of a reference character and an object character is read from the table, and the characters are arranged according to the space reduction amount.

In another kerning method, a dot facing space between dot partterns of two character faces is determined in a direction of character arrangement. The characters are then arranged so that the dot facing space agrees with a desired facing space.

In a different kerning method developed recently, a facing space between two character faces is computed in a direction of character arrangement. The characters are then arranged so that the facing space agrees with a designated facing space.

In the conventional kerning methods noted above, a space reduction amount is determined for each pair of characters successively from the beginning of a character string. However, where the character string includes a small character or sign such as "." (middle dot), the two characters at opposite sides of "." come too close to each other, thereby impairing visual recognition and appearance. Particularly where letters "T" are present at opposite sides of ".", for example, the two T's overlap each other to the detriment of visual recognition and appearance.

SUMMARY OF THE INVENTION

The present invention has been made having regard to the state of the art noted above, and its object is to provide a practical kerning method and electronic typographic/editing apparatus which eliminate the inconvenience of two characters coming too close to or overlapping each other across a small character or sign included in a character string.

The above object is fulfilled, according to the present invention, by a kerning method of adjusting position of at least three characters each defined by an imaginary character frame including a face which represents a configuration of a character therein, the method comprising:

a character arranging step for arranging a first character, a second character and a third character in this order;

a space reducing step for reducing a first space between the first and second characters by a first space reduction amount and a second space between the second and third characters by a second space reduction amount;

a character space computing step for computing a third space between the first character and the third character;

a character space judging step for judging whether the third space is smaller than a reference space; and a space reduction correcting step for correcting at least one of the first space reduction amount and the second space reduction amount when the third space is smaller than the reference space, so that the third space is not smaller than the reference space.

In the method according to the present invention, the space reducing step is executed by regarding one of the characters as a reference character, and the immediately succeeding character as an object character to be kerned relative to the reference character, in arranging at least three characters with positional adjustment in a predetermined direction. The character space computing step is executed for computing a space between the first character and the third character (i.e. first to third character facing space) of the three characters (i.e. the leading, first character, the middle, second character and the last, third character) arranged with successive space reductions. At the following, character space judging step, a judgment is made whether the first character and the third character are too close to each other. When the first and third characters are too close to each other, the space reduction correcting step is executed for correcting space reduction amount(s).

That is, when the three characters are arranged with successive space reductions, the character space computing step is executed to compute the first to third character facing space. If this facing space is smaller than the reference space, at least one of the space reduction amounts for the second character and the third character is slightly diminished so that the first to third character facing space becomes at least equal to the reference space, thereby eliminating an excessive closeness between the first and third characters. A well-balanced arrangement of characters is assured even where the second character is a small character, with the first and third characters tending to be too close to each other across the small, second character. The adjustment of the first to third character facing space is effected by adjusting the space reduction amounts for the second and third characters. Thus, the correcting process for the space reduction amounts may be carried out in a simple manner.

In the method according to the present invention described above, the third space between the first character and the third character is defined, for example, by a space between face frames of the first character and the third character, the face frames surrounding outermost configurations of the faces. In this case, the character space computing step comprises the steps of obtaining a first face frame space between the face frames of the first character and the second character, obtaining a second face frame space between the face frames of the second character and the third character, and calculating the third space from the first face frame space, the second face frame space and a dimension of the face frame of the second character.

At the above character space computing step, the space between the first character and third character is defined as a space (face frame space) between rectangular face frames surrounding outermost configurations of the respective faces thereof. This first to third character facing space is computed by the following process.

A face frame space between the first character and the second character is derived from a space reduction amount for the second character, a space width (rear space), rearwardly with respect to the direction of arrangement, between character frame and face frame of the first character, and a space width (front space), forwardly with respect to the direction of arrangement, between character frame and face frame of the second character.

Further, a face frame space between the second character and the third character is derived from a space reduction amount for the third character, a space width (rear space), rearwardly with respect to predetermined direction of arrangement, between character frame and face frame of the second character, and a space width (front space), forwardly with respect to the direction of arrangement, between character frame and face frame of the third character.

Then, the first to third character facing space is derived from the two face frame spaces derived, and a face frame length (face size), in the direction of arrangement, of the second character.

The character space between the first character and third character may be derived simply and quickly from the data between the first character and second character, the data between the second character and third character, and the face frame length of the second character, without directly combining the data of the first character and third character.

In the method according to the present invention described above, the space reduction correcting step, preferably, comprises the step of correcting the first space reduction amount and the second space reduction amount by correction amounts in a predetermined distribution. Specific examples of executing this step are as follows.

As a first example, the space reduction correcting step may be executed for correcting the first and second space reduction amounts by an equal correction amount.

As a second example, the space reduction correcting step may be executed for correcting the first and second space reduction amounts by correction amounts corresponding to a ratio between the first face frame space and the second face frame space.

As a third example, the first and second space reduction amounts may be corrected by correction amounts corresponding to a ratio between the first space reduction amount and the second space reduction amount.

In the method according to the present invention, the space reducing step is not limited to any particular mode of obtaining the first and second space reduction amounts. For example, the space reduction amounts corresponding to specific pairs of the predetermined characters may be stored in a table in advance, and the space reducing step may comprise the steps of obtaining the first space reduction amount corresponding to the pair of the first and second characters from the table if the pair of the first and second characters are one of the specific pairs, and obtaining the second space reduction amount corresponding to the pair of the second and third characters from the table if the pair of the second and third characters are one of the specific pairs.

In another aspect of the present invention, there is provided an electronic typographic/editing apparatus having a function for positionally adjusting, with successive space reductions in a predetermined direction of arrangement, at least three characters each defined by a character frame including a face therein, the three characters having a first character, a second character and a third character arranged in this order, the apparatus comprising:

a character string data input for inputting character string data to be edited and including a font name, a character size and character codes;

a character string data storage for storing the character string data inputted;

a facing space designating unit for designating facing spaces between adjacent pairs of characters;

a reference space designating unit for designating a reference space between the first character and the third character of the three characters arranged with successive space reductions;

a font storage for storing font data of a group of characters;

a character data processing unit for fetching the font data from the font storage by referring to the font name and the character codes among the character string data stored in the character string data storage, and for converting the font data into character data corresponding to the character size among the character string data;

a space reduction computing unit, in arranging the characters based on the character data with positional adjustment, for successively computing a space reduction amount for each character regarded as an object character, relative to an immediately preceding one of the characters acting as a reference character, so that a facing space between the reference character and the object character agrees with the facing space designated by the facing space designating unit;

a character space computing unit for computing a first to third character facing space between the first character and the third character from the character data converted, and a space reduction amount for the second character and a space reduction amount for the third character;

a character space judging unit for judging whether the first to third character facing space computed is smaller than the reference space;

a space reduction correcting unit for correcting at least one of the space reduction amount for the second character and the space reduction amount for the third character when the first to third character facing space is smaller than the reference space, so that the first to third character facing space becomes at least equal to the reference space; and a display/output unit for displaying an adjusted character string based on the character string data stored in the character string data storage, and corrected space reduction amounts for the characters.

With the apparatus according to the present invention, a character string is arranged with an adjustment made as follows.

First, character string data to be edited is inputted through the character string data input, and stored in the character string data storage. The operator designates a facing space between adjacent characters through the facing space designating unit, and a reference space between a first character and a third character through the reference space designating unit. The character data processing unit refers to a font name and character codes in the character string data, fetches font data of the characters constituting the character string from the font storage, and converts the font data into character data corresponding to the character size among the character string data. Based on the character data obtained, the space reduction computing unit successively computes a space reduction amount for each successive character, so that the facing space between adjacent characters agrees with the facing space designated. The character space computing unit computes a space between the first character and the third character from the character data, and the space reduction amount computed for each character. The character space judging unit judges whether the first to third character facing space computed is smaller than the reference space. When the first to third character facing space is found smaller than the reference space, the space reduction correcting unit corrects at least one of the space reduction amounts for the second character and third character, so that the first to third character facing space becomes at least equal to the reference space. The display/output unit displays an adjusted character string based on the character string data stored in the character string data storage, and corrected space reduction amounts for the characters.

The electronic typographic/editing apparatus according to the present invention allows a character string to be edited for a well-balanced arrangement. Even where the character string includes a small character, characters at opposite sides of the small character are arranged without coming too close to each other.

The character space computing unit and space reduction correcting unit included in the above apparatus may be implemented in varied modes as described hereinbefore in relation to the kerning method according to the present invention.

BRIEF DESCRIPTION OF THE DRAWINGS

For the purpose of illustrating the invention, there is shown in the drawings a form which is presently preferred, it being understood, however, that the invention is not limited to the precise arrangements and instrumentalities shown.

FIG. 9 is a schematic view of a character string information storage;

FIG. 14 is a schematic view of a table of characters and space widths;

FIG. 15 is a schematic view of a table of characters and correction ratios;

FIG. 16 is a schematic view of a table of characters and space reduction amounts;

DETAILED DESCRIPTION OF THE PREFERRED EMBODIMENTS

Preferred embodiments of the present invention will be described in detail hereinafter with reference to the drawings.

First Embodiment

Figure 1:
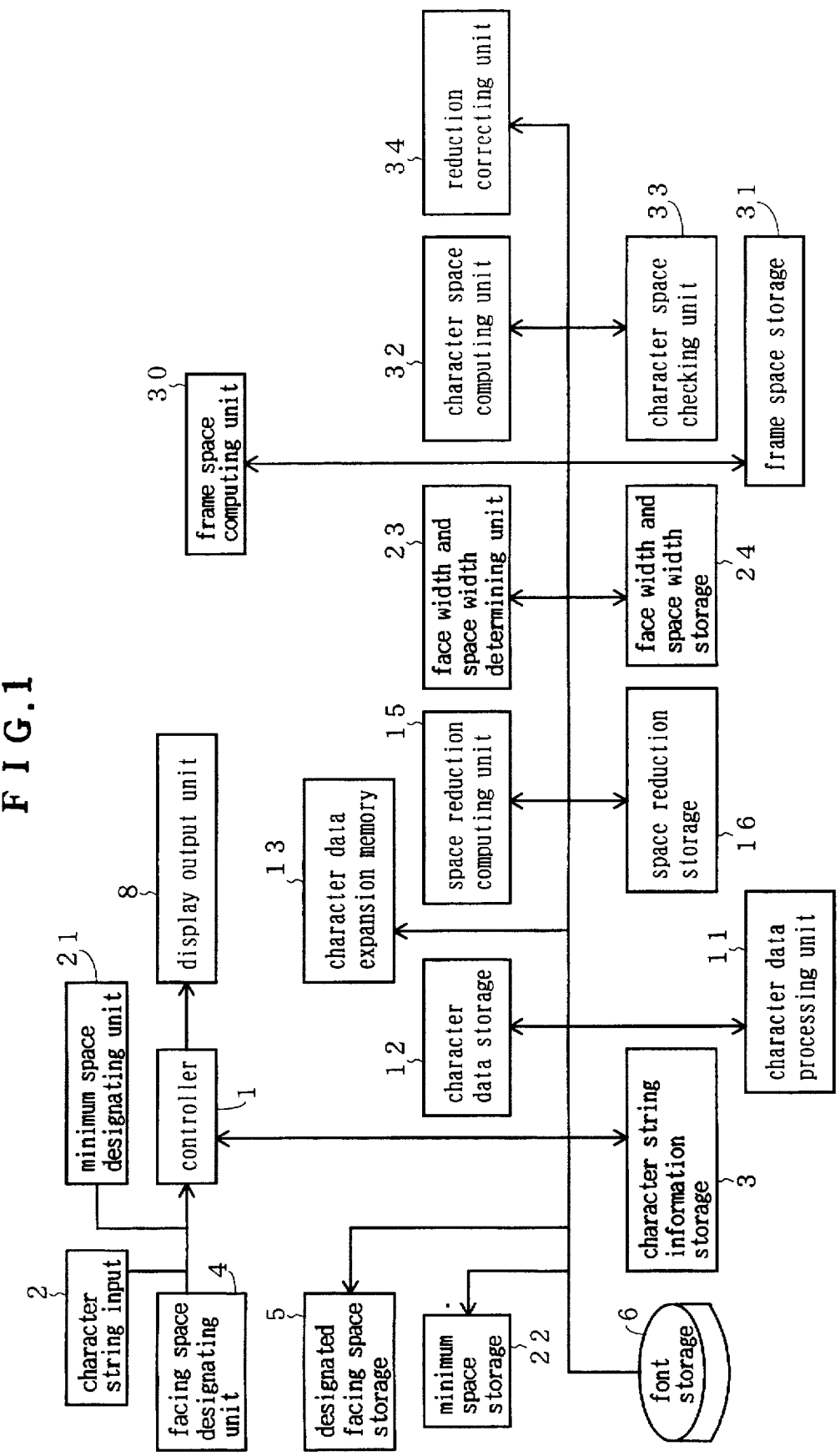
FIG. 1 is a block diagram showing an outline of an electronic typographic/editing apparatus according to the present invention.
Figure 2:
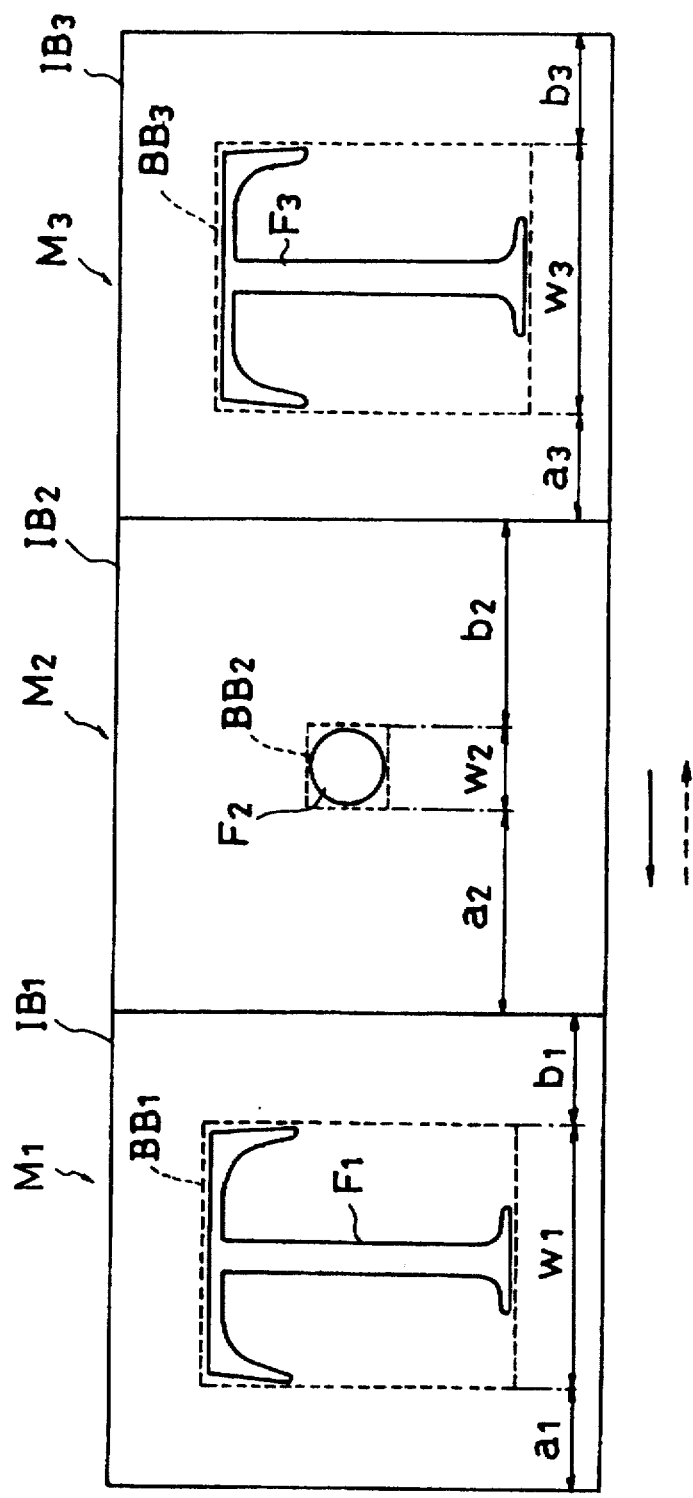
FIG. 2 is an explanatory view of a first embodiment in which three characters to be kerned are arranged in a state called "solid matter"

FIG. 1 is a block diagram showing an outline of an electronic typographic/editing apparatus using a kerning method in a first embodiment of the present invention. FIG. 2 is an explanatory view of the first embodiment, showing a state called "solid matter" in which characters to be kerned are arranged with imaginary bodies thereof contacting each other. In this embodiment, a kerning process is performed in arranging three characters, i.e. "T" acting as a first character M1, "." acting as a second character M2, and "T" acting as a third character M3, sideways (by placing a character at a side of a preceding character).

Numeral 1 in FIG. 1 denotes a controller for executing the kerning method as a principal function thereof. The controller 1 includes a CPU and memories such as a ROM and a RAM not shown. A character string input 2 receives character string data from a medium storing character string data files (font names, character sizes, character codes, etc.) created on a word processor or the like. The character string data received is stored in a character string information storage 3 under control of the controller 1. The character string data stored in the character string information storage is used as reference by the controller 1. A facing space designating unit 4 is used by the operator to input a space between adjacent characters (designated facing space $r_0$), and this facing space is stored in a designated facing space storage 5. The designated facing space $r_0$ stored in the designated facing space storage 5 is used as reference by the controller 1.

The controller 1 reads from a font storage 6 vector font data corresponding to the character string data stored in the character string information storage 3. A character data processing unit 11 forms vector data (e.g. data of size 100×100) corresponding to a designated character size from the vector font data read, or converts the vector data into dot pattern data having a predetermined number of dots (e.g. 100×100 which is in the ratio of 1:1 to the vector data, 50×50 which is in the ratio of 1:2 to the vector data, or 10×10 which is in the ratio of 1:10 to the vector data). The vector data or dot pattern data is stored in a character data storage 12. The controller 1 copies this data from the character data storage 12 to a character data expansion memory 13 for expansion processing as necessary.

The vector font data provides character faces mathematically expressed by functions to represent a character style. The functions give closed letterform areas of black pixels corresponding to the character faces (character patterns), the remaining areas being filled with white pixels. FIG. 2 shows characters expressed by vector data corresponding to a character size. Blank areas within faces (character patterns) F1, F2 and F3 ("T", "." and "T") enclosed in imaginary bodies IB1, IB2 and IB3 are filled with black pixels, and the rest filled with white pixels. The dot pattern data provides character faces in bit maps (e.g. formed of "1" of binary data). In the dot pattern data, for example, the dots forming character patterns correspond to "1" of binary data, and those forming the other areas to "0" of binary data.

A space reduction computing unit 15 computes a space reduction amount for two adjacent characters arranged in the state of "solid matter", and more particularly a space reduction amount for (the imaginary body of) the succeeding character with respect to the preceding character acting as a reference character, so that the faces of the two characters have the designated facing space $r_0$ therebetween. The space reduction amount computed is stored in a space reduction storage 16.

A minimum space designating unit 21 is used by the operator to input a reference space for determining whether a facing space between the first character M1 and the third character M3 (i.e. first to third character facing space $r_M$) is appropriate when the three characters (the leading, first character M1, the middle, second character M2 and the rear, third character M3) are arranged with a kerning adjustment (the space permitted between the first character M1 and third character M3 being hereinafter called minimum facing space $r_1$). The minimum facing space $r_1$ is stored in a minimum space storage 22 for reference by the controller 1. In this embodiment, the first to third character facing space $r_M$ is a space between rectangular bounding boxes BB1 and BB3 defining outermost contours of the faces F1 and F3 of the first character M1 and third character M3, respectively.

A face width and space width determining unit 23 derives, from the character data, a face width of each character and a space (space width) between the bounding box and imaginary body thereof, which are necessary for computing the character facing space $r_M$. These widths are stored in a face width and space width storage 24.

A frame space computing unit 30 computes a space (face frame space) between bounding boxes BB1 and BB2 and a space (face frame space) between bounding boxes BB2 and BB3 necessary for computation of the first to third character facing space $r_M$. These spaces computed are stored in a frame space storage 31.

A character space computing unit 32 computes the first to third character facing space $r_M$, i.e. a space between bounding boxes BB1 and BB3 of the first character M1 and third character M3 when the three characters M1–M3 are arranged with a kerning adjustment.

A character space checking unit 33 determines propriety of the first to third character facing space $r_M$ computed by the character space computing unit 32, through comparison with the minimum facing space $r_1$ stored in the minimum space storage 22.

When the character space checking unit 33 determines that the first to third character facing space $r_M$ is smaller than the minimum facing space $r_1$ and is therefore improper, a reduction correcting unit 34 corrects the space reduction amount or amounts obtained earlier, thereby overriding the result of determination. A corrected space reduction amount or amounts are stored as new data in the space reduction storage 16, and applied to the character string data stored in the character string information storage 3.

The controller 1 transmits, to a display/output unit 8, the character string data stored in the character string information storage 3, to which the space reduction amounts have been applied. Then, the data is displayed on a display device such as a CRT or outputted to an output device such as a printer.

Figure 8:
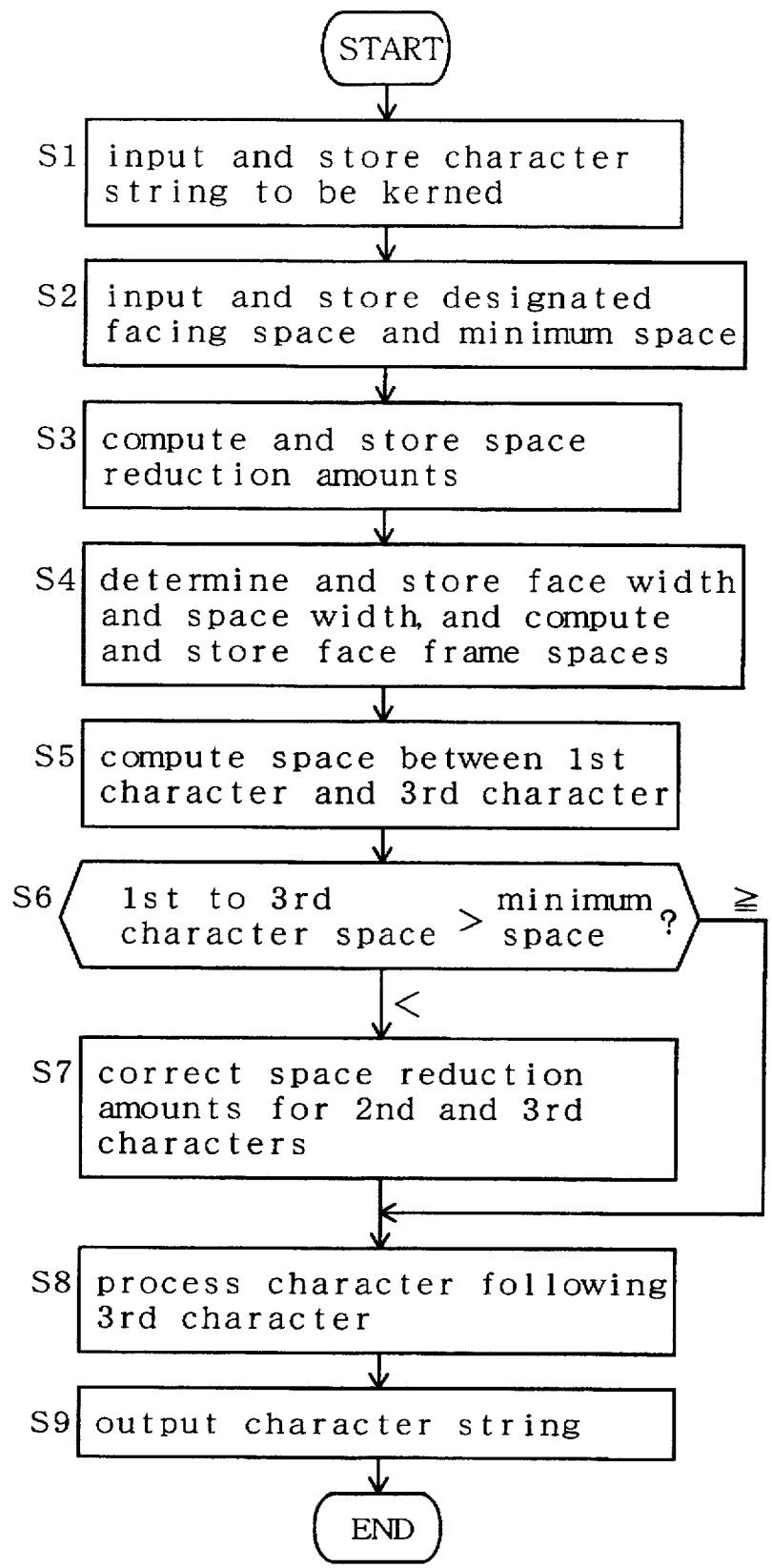
FIG. 8 is a flowchart showing an overall sequence of a kerning process in the first and second embodiments.

Next, an operation of the above apparatus in kerning the three characters shown in FIG. 2 will be described in detail. FIG. 8 is a flow chart showing an overall sequence of the kerning process. An outline of the kerning process in the first embodiment is as follows. The first character M1 is regarded as a reference character, and the second character M2 as an object character. The second character M2 is placed next to the first character M1 with a reduction in space therebetween. Next, the second character M2 is regarded as a reference character, and the third character M3 as an object character. The third character M3 is placed next to the second character M2 with a reduction in space therebetween.

Then, the facing space $r_M$ between the first character M1 and third character M3 is checked to determine its propriety, and the space reduction amounts for the second character M2 and third character M3 are corrected as necessary.

FIG. 2 shows the three characters arranged in a state of "solid matter" (with zero space reduction) to be kerned in this embodiment. In this embodiment, the kerning process is performed in a horizontal direction for the first character M1 which is "T", the second character M2 which is ".", and the third character M3 which is "T" again. Thus, in FIG. 2, the characters are kerned in the direction indicated by a solid line arrow, the direction indicated by a broken line arrow being the counter kerning direction.

Step S1 (input and store character string to be kerned):

The character string input 2 receives character string data from a medium storing character string data files (font names, character sizes, character codes, etc.) created on a word processor or the like. The character string data is stored in the character string information storage 3.

Step S2 (input and store designated facing space and minimum space):

The facing space designating unit 4 is operated to input a designated facing space $r_0$ which is stored in the facing space data storage 5. The minimum space designating unit is operated to input a minimum facing space $r_1$ between the first character M1 and third character M3, which is stored in the minimum space storage 22. The minimum facing space $r_1$ may correspond to, or may be larger or smaller than, the designated facing space $r_0$. Normally, a value zero or above is selected as minimum facing space $r_1$ since the minimum facing space $r_1$ less than zero is indicative of the first character M1 and third character M3 overlapping each other.

Step S3 (compute and store space reduction amounts):

In this embodiment, an object character is positionally adjusted relative to a reference character to bring the facing space therebetween into agreement with the designated facing space $r_0$. This process is carried out by computing a space reduction amount for each successive object character.

In the course of space reduction computation, the space reduction computing unit 15 computes two space reduction amounts, i.e. a first space reduction amount for the second character M2 "." acting as the object character with respect to the first character M1 "T" acting as the reference character, and a second space reduction amount for the third character M3 "T" acting as the object character with respect to the second character M2 "." acting as the reference character. For the purpose of this computation, the solid matter state at the initial stage is regarded as having zero space reduction.

Figure 3:
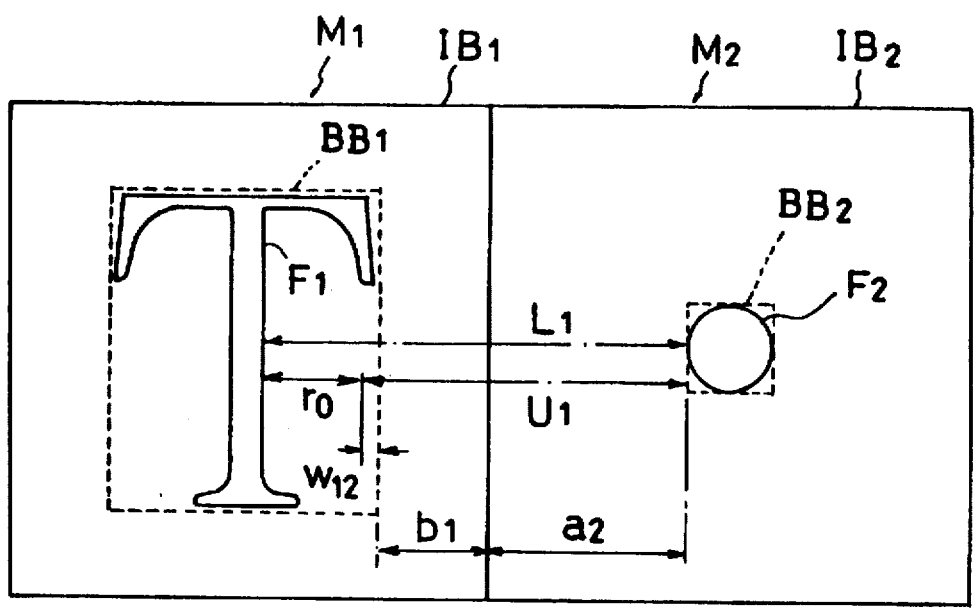
FIG. 3 is an explanatory view of the first embodiment, showing the first two characters in "solid matter" state.

The computation of a space reduction amount for the object character with respect to the reference character is not limited to a particular method, but may be performed as follows, for example. In computing the first space reduction amount, the computing unit 15 determines a minimum facing space between the first character M1 and second character M2, i.e. a minimum facing space L1 among facing spaces between the two characters as seen in directions parallel to the direction of space reduction. The controller 1 reads the character data of the first character M1 and second character M2 from the character data storage 12, and expands these data in the character data expansion memory 13. FIG. 3 schematically shows an expanded state. As seen, the minimum facing space L1 is a space between the right edge of the vertical shank of the first character M1 "T" and the left edge of the second character M2 ".". Specifically, facing spaces are derived from font information of the first character M1 and second character M2, determined by horizontal scans over the character data, or determined between dots forming the faces and horizontally opposed to each other. The minimum facing space L1 is determined by selecting a minimum from among these facing spaces.

The second character M2 is kerned with respect to the first character M1 to bring the minimum facing space L1 into agreement with the designated facing space $r_0$. Thus, the first space reduction amount U1 is derived from the equation [first space reduction amount U1=minimum facing space L1 −designated facing space $r_0$], and the result is stored in the space reduction storage 16.

Figure 4:
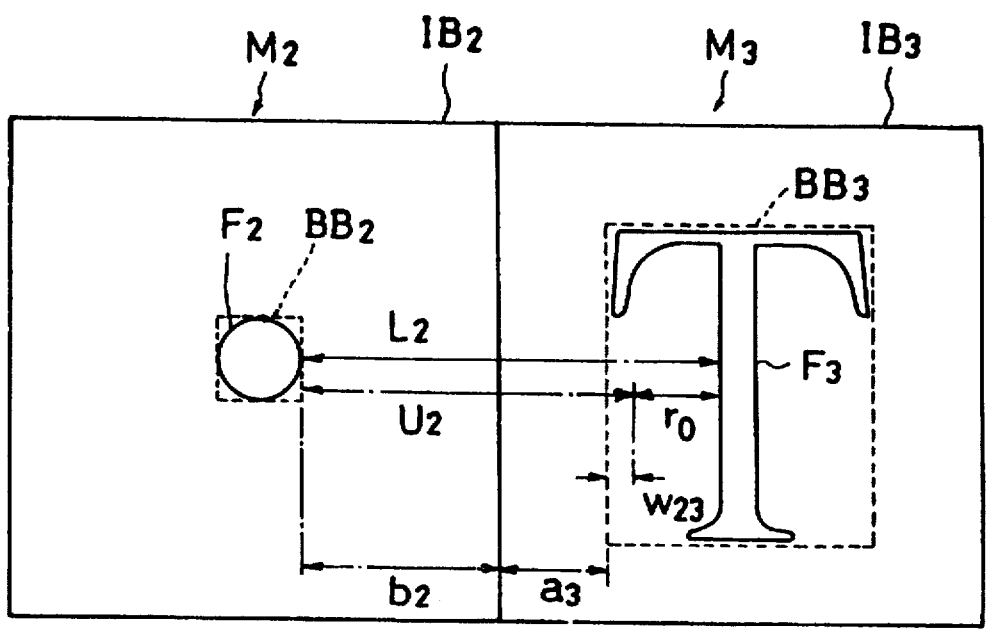
FIG. 4 is an explanatory view of the first embodiment, showing the next two characters in "solid matter" state.

Similarly, in computing the second space reduction amount, the computing unit 15 determines a minimum facing space between the second character M2 and third character M3, i.e. a minimum facing space L2 among facing spaces between the two characters as seen in directions parallel to the direction of space reduction. The controller 1 reads the character data of the second character M2 and third character M3 from the character data storage 12, and expands these data in the character data expansion memory 13. FIG. 4 schematically shows an expanded state. As seen, the minimum facing space L2 is a space between the right edge of the second character M2 "." and the left edge of the vertical shank of the third character M3 "T". The third character M3 also is kerned with respect to the second character M2 to bring the minimum facing space L2 into agreement with the designated facing space $r_0$. That is, the second space reduction amount U2 is derived from the equation [second space reduction amount U2=minimum facing space L2 −designated facing space $r_0$], and the result is stored in the space reduction storage 16.

Step S4 (determine and store face width and space width, and compute and store face frame spaces):

To enable the character space computing unit 32 to compute the character facing space $r_M$ between the first character M1 and third character M3, the face width and space width determining unit 23 must determine the face width and space width of each character in advance. The face width and space width are available from the font information. Rear space width $b_1$ of the first character M1, front space width $a_2$, rear space width $b_2$ and face width W2 of the second character M2, and front space width $a_3$ of the third character M3 are stored in the face width and space width storage 24.

Next, the frame space computing unit 30 computes a face frame space W12 between bounding boxes BB1 and BB2 of the first and second characters M1 and M2, and a face frame space W23 between bounding boxes BB2 and BB3 of the second and third characters M2 and M3. These space data are stored in the frame space storage 31. The face frame space has a negative value (with "−" attached to a distance) when the two adjacent bounding boxes overlap each other.

Figure 5:
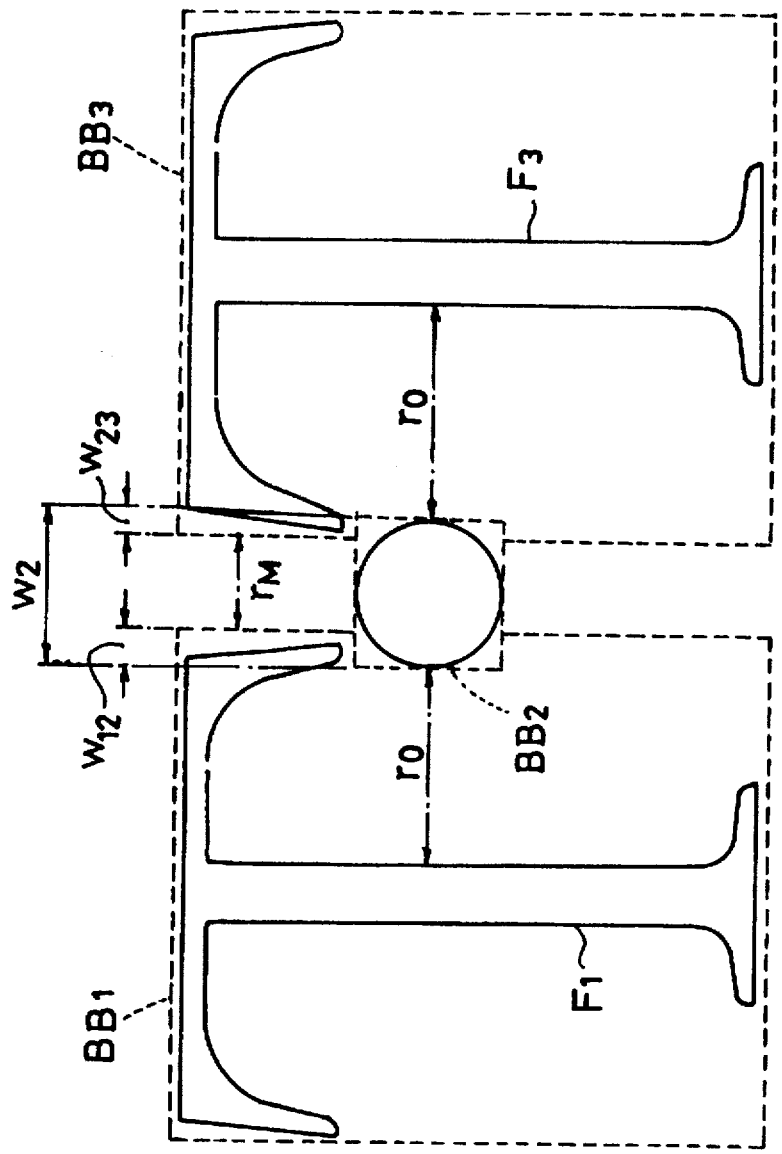
FIG. 5 is an explanatory view of the first embodiment, showing the three characters arranged with space reductions.

For example, both spaces W12 and W23 have negative values when the characters are kerned as shown in FIG. 5.

The face frame space W12 between bounding boxes BB1 and BB2 of the first and second characters M1 and M2 corresponds to a reduction by the first space reduction amount U1 of the space, i.e. [rear space $b_1$+front space $a_2$], between the two boxes BB1 and BB2 in time of zero space reduction. Therefore, the face frame space W12 is derived from the following equation:

face frame space W12=rear space $b_1$+front space $a_2$−first space reduction amount U1

The face frame space W23 between bounding boxes BB2 and BB3 of the second and third characters M2 and M3 corresponds to a reduction by the second space reduction amount U2 of the space, i.e. [rear space $b_2$+front space $a_3$], between the two boxes BB2 and BB3 in time of zero space reduction. Therefore, the face frame space W23 is derived from the following equation:

face frame space W23=rear space $b_2$+front space $a_3$−second space reduction amount U2

Step S5 (compute facing space $r_M$ between first character M1 and third character M3):

Next, the character space computing unit 32 computes a space (first to third character facing space) $r_M$ between the first character M1 and third character M3 when the three characters M1–M3 are arranged with successive kerning adjustments based on the first space reduction amount U1 and second space reduction amount U2.

The first to third character facing space $r_M$ is a space (face frame space) between bounding boxes BB1 and BB3.

FIG. 5 shows the three characters M1–M3 arranged with the successive kerning adjustments. As seen from FIG. 5, the first to third character facing space $r_M$ may be expressed by the following equation:

first to third character facing space $r_M$=[face width W2 of second character M2]+[face frame space W12 between bounding boxes BB1 and BB2 of first and second characters M1 and M2]+[face frame space W23 between bounding boxes BB2 and BB3 of second and third characters M2 and M3]

To express the above equation only with signs, $r_M$ =W2 +W12+W23.

In the above equation, the face frame space W12 or W23 has a negative value when the first space reduction amount U1 or second space reduction amount U2 is so large as to overlap the bounding boxes BB1 and BB2 or BB2 and BB3. If the first to third character facing space $r_M$ has a negative value as a result, the first character M1 and third character M3 overlap each other.

Based on the above equation, the character space computing unit 32 derives the first to third character facing space $r_M$ from the first space reduction amount U1 and second space reduction amount U2 read from the space reduction storage 16, and the face frame spaces W12 and W23 read from the frame space storage 31.

Step S6 (determine as to first to third character facing space<minimum facing space):

The character space checking unit 33 determines whether the first to third character facing space $r_M$ computed by the character space computing unit 32 is smaller than the minimum facing space $r_1$ or not. The result "no" (i.e. character facing space $r_M$ ≧minimum facing space $r_1$) indicates that the first character M1 and third character M3 are appropriately spaced from each other (not overlapping each other, i.e. $r_M$ ≧0 when $r_1$=0). Then, the first and second space reduction amounts U1 and U2 remain uncorrected.

The result "yes" (i.e. character facing space $r_M$ <minimum facing space $r_1$) indicates that the first character M1 and third character M3 are too close to each other (overlapping each other, i.e. $r_M$ <0 when $r_1$=0). Then, the following correction is made to the first and second space reduction amounts U1 and U2.

Figure 6A:
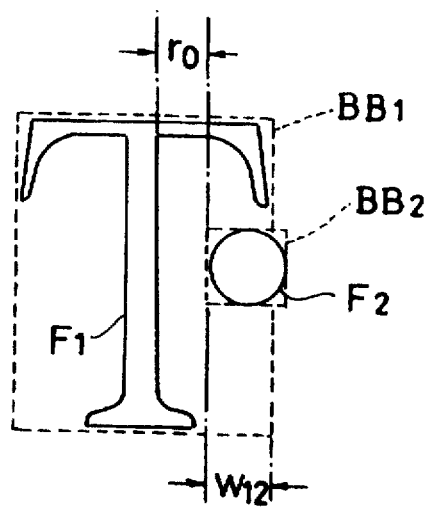
FIGS. 6A through 6C are explanatory views of the first embodiment, showing the characters overlapping one another.
Figure 6B:
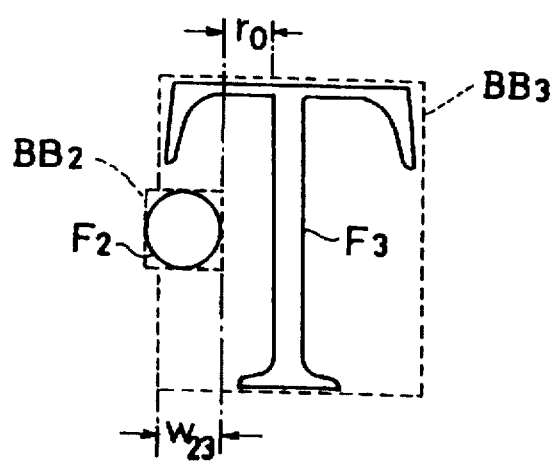
Figure 6C:
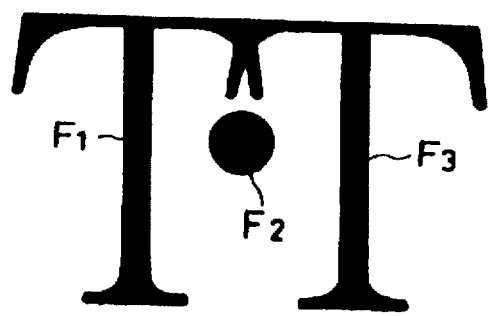

When, as shown in FIGS. 6A and 6B, the small, second character M2 "." protrudes deep into the regions of first character M1 and third character M3, the bounding boxes BB1, BB2 and BB3 overlap to an excessive extent. Then, the face frame spaces W12 and W23 have large negative values, giving a negative value to the first to third character facing space $r_M$ also. As a result, the two "T"s overlap each other in a kerned state as shown in FIG. 6C. A correction must be made to the space reduction amounts in this case.

It should be noted here that, in the present invention, the correction is effected through minimum variations in the first and second space reduction amounts U1 and U2 instead of inputting a new designated facing space $r_0$ to repeat the computation of the first and second space reduction amounts U1 and U2 per se. Only one of the first and second space reduction amounts U1 and U2 may be corrected, leaving the other uncorrected. However, in this embodiment, both of the first and second space reduction amounts U1 and U2 are diminished by correction amounts ΔU1 and ΔU2, respectively, to establish character facing space $r_M$ =minimum facing space $r_1$. With this minimum correction, and without effecting an excessive correction to the first and second space reduction amounts U1 and U2, the result of determination by the character space checking unit 33 changes to "no" (i.e. character facing space $r_M$ ≧minimum facing space $r_1$).

Step S7 (correct space reduction amounts for second character M2 and third character M3):

The reduction correcting unit 34 determines correction amounts ΔU1 and ΔU2 to establish first to third character facing space $r_M$ =minimum facing space $r_1$. After the correction with correction amounts ΔU1 and ΔU2, the first to third character facing space $r_M$ is expressed by the following equation, which equals the minimum facing space $r_1$:

$$r_M = W2 + W12' + W23' = r_1$$

In the above equation, W12' is a face frame space between bounding boxes BB1 and BB2 of the first and second characters M1 and M2 after the correction, which is expressed by the following equation:

face frame space W12'=rear space $b_1$+front space $a_2$−(first space reduction amount U1−ΔU1)=W12+ΔU1

Similarly, W23' is a face frame space between bounding boxes BB2 and BB3 of the second and third characters M2 and M3 after the correction, which is expressed by the following equation:

face frame space W23'=rear space $b_2$+front space $a_3$−(second space reduction amount U2−ΔU2)=W23+ΔU2

Therefore, $$r_M = W2 + W12 + \Delta U1 + W23 + \Delta U2 = r_1$$

In the case of the second character M2 ".", the front space $a_2$ and rear space $b_2$ are the same size. If the two spaces are corrected by the same amount, i.e. correction amounts ΔU1=ΔU2, then $$\Delta U1 = \Delta U2 = (r_1 - W2 - W12 - W23)/2$$

Since the values in the right side are all known, the values of ΔU1 and ΔU2 are determined immediately.

For the first space reduction amount, [first space reduction amount U1−ΔU1] is stored as the corrected space reduction amount in the space reduction storage 16. For the second space reduction amount, [second space reduction amount U2−ΔU2] is stored as the corrected space reduction amount in the space reduction storage 16.

Figure 7A:
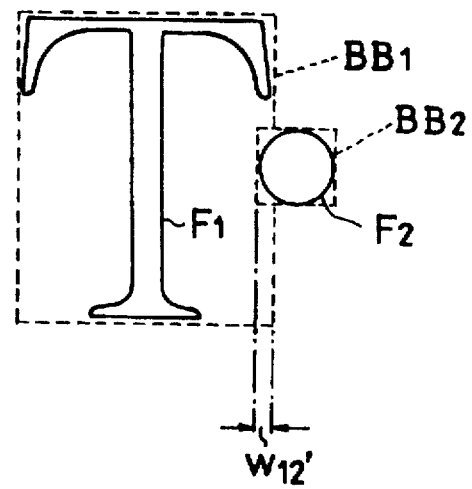
FIGS. 7A through 7C are explanatory views of the first embodiment, showing the characters after a correction of the overlap.
Figure 7B:
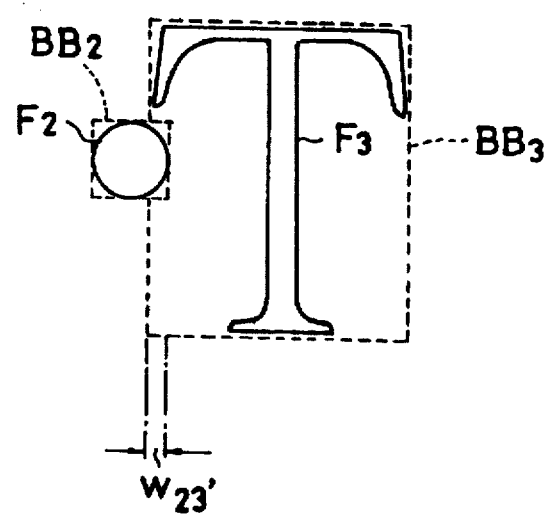
Figure 7C:
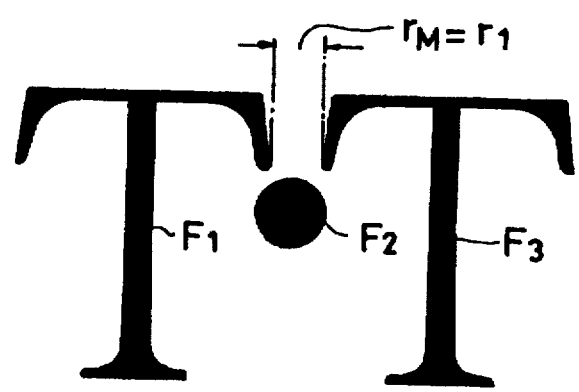

This correction cancels the overlapping of the first and third characters M1 and M3 shown in FIGS. 6A–6C. As shown in FIGS. 7A and 7B, "." now protrudes only slightly into the regions of first character M1 and third character M3, and the bounding boxes BB1, BB2 and BB3 overlap to a reduced extent. The face frame spaces W12' and W23' have small negative values, whereby the first to third character facing space $r_M$ has an appropriate positive amount. The first character M1 and third character M3 are arranged with an appropriate space therebetween as shown in FIG. 7C.

Step S8 (correction for fourth character following third character):

Where the third character is followed by a fourth character, the foregoing process is repeated by regarding the second character as a first character, the third character as a second character, and the fourth character as a third character. The same process is repeated till the final character.

Upon completion of the kerning process, the respective space reduction amounts are affixed to the corresponding character codes and stored in the character string information storage 3. FIG. 9 schematically shows the character string information storage 3 to which the space reduction amounts are applied.

Step S9 (output character string):

After the above process, the controller 1 refers to the character string information storage 3 and font storage 6, and outputs the finally adjusted character string to the display/output unit 8.

Second Embodiment

Figure 10:
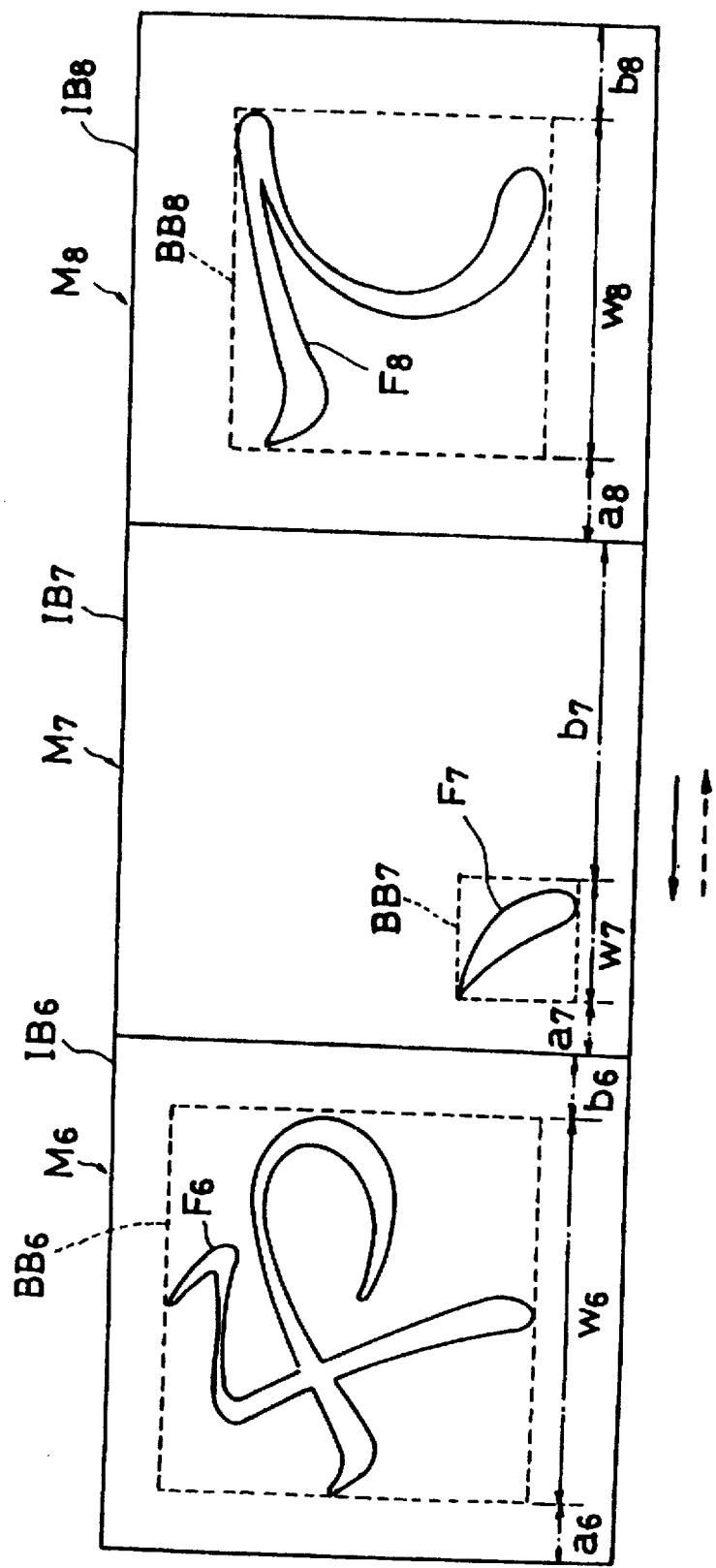
FIG. 10 is an explanatory view of the second embodiment in which three characters to be kerned are arranged in "solid matter"

FIG. 10 shows an arrangement ("solid matter") of characters to be subjected to a kerning process in the second embodiment. In this embodiment, the kerning process is performed in a horizontal direction for the first character M6 which is "や", the second character M7 which is "い", and the third character M8 which is "て". In FIG. 10, references IB6, IB7 and IB8 denote imaginary bodies, references BB6, BB7 and BB8 bounding boxes, F6, F7 and F8 faces (character patterns), W6, W7 and W8 face widths, $a_6$, $a_7$, and $a_8$ front spaces, and $b_6$, $b_7$ and $b_8$ rear spaces. The solid line arrow indicates a kerning direction, and the broken line arrow a counter kerning direction.

The electronic typographic/editing apparatus used in this embodiment has the same overall construction as in the first embodiment, and will not be described again. The kerning process in this embodiment also has an overall sequence similar to what is shown in FIG. 8. The steps common to the kerning process in the first embodiment will be described only briefly to avoid repetition.

An outline of the kerning process in this embodiment is as follows. The second character M7 is placed next to the first character M8 with a reduction in space therebetween. Next, the third character M8 is placed next to the second character M7 with a reduction in space therebetween. Then, the facing space between the first character M6 and third character M8 is checked to determine its propriety, and space reduction amounts for the second character M7 and third character M8 are corrected as necessary. Thus far, this embodiment is the same as the first embodiment. The characterizing feature of this embodiment lies in that the space reduction amounts for the second character M7 and third character M8 are corrected by amounts based on a ratio between the front space $a_7$ and rear space $b_7$ of the second character M7. This feature will particularly be described hereinafter.

Figure 11:
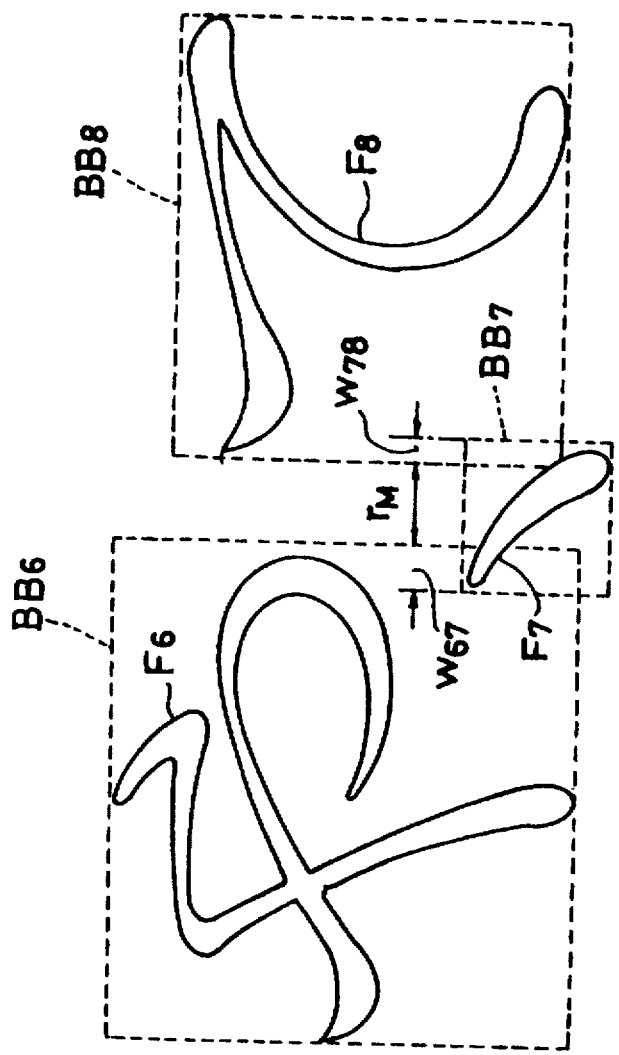
FIG. 11 is an explanatory view of the second embodiment, showing the three characters arranged with space reductions.

Steps S1–S6:

As in the first embodiment, a character string to be kerned is inputted and stored (S1). A facing space $r_0$ and a minimum space $r_1$ are designated (S2). Space reductions for the second character M7 and third character M8 are computed to bring the facing space between reference character and object character into agreement with the designated facing space $r_0$ (S3). At step S4, a space (face frame space) W67 between bounding boxes BB6 and BB7 of the first and second characters M6 and M7 is determined by subtracting the space reduction amount U6 of the second character M7 from a sum ($b_6+a_7$) of the rear space $b_6$ of the first character M6 and the front space $a_7$ of the second character M7 (see FIG. 11). A space (face frame space) W78 between bounding boxes BB7 and BB8 of the second and third characters M7 and M8 is determined in a similar way. Then, a facing space $r_M$ between the first and third characters M6 and M8 is derived from the face width W7 of the second character M7, the face frame space W67 between the first and second characters M6 and M7, and the face frame space W78 between the second and third characters M7 and M8 (S5). The first to third character facing space $r_M$ is checked to see if it is smaller than the minimum space $r_1$ (S6).

Figure 12:
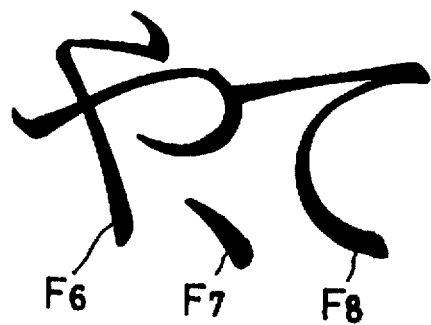
FIG. 12 is an explanatory view of the second embodiment, showing the characters overlapping one another.

Step S7 (correct space reduction amounts for second character M7 and third character M8):

When the first to third character facing space $r_M$ is found smaller than the minimum space $r_1$, the face F6 of the first character M6 and the face F8 of the third character M8 are too close to each other or overlap each other to present an ugly appearance as seen in FIG. 12. As in the first embodiment, step S7 is executed to determine correction amounts $\Delta U6$ and $\Delta U7$ for establishing character facing space $r_M$ = minimum facing space $r_1$.

As in the first embodiment, the first to third character facing space $r_M$ is expressed by the following equation:

$$r_M = W7 + W67 + \Delta U6 + W78 + \Delta U7 = r_1$$

If the correction amounts $\Delta U6$ and $\Delta U7$ are equal as in the first embodiment ($\Delta U6 = \Delta U7$), the appearance is not necessarily improved for certain faces. For example, as shown in FIG. 10, the second character M7 "" in the kerning process according to this embodiment has the face F7 disposed leftward in the imaginary body IB7, rendering the front space $a_7$ and rear face $b_7$ unequal. In such a case, rather than equalizing correction amounts $\Delta U6$ and $\Delta U7$, the difference between the front and rear spaces $a_7$ and $b_7$ should be reflected in the ratio between the correction amounts $\Delta U6$ and $\Delta U7$ to realize a well-balanced arrangement.

In this embodiment, $\Delta U6$ and $\Delta U7$ are determined based on the ratio between the front and rear spaces, as expressed by the following equation:

$$\Delta U6 : \Delta U7 = \text{front space } a_7 : \text{rear space } b_7$$

Therefore, correction amounts $\Delta U6$ and $\Delta U7$ are expressed as follows:

$$\Delta U6 = [r_1 - (W7 + W67 + W78)] \times [(a_7)/(a_7+b_7)]$$

$$\Delta U7 = [r_1 - (W7 + W67 + W78)] \times [(b_7)/(a_7+b_7)]$$

Since the values in the right sides are all known, the values of $\Delta U6$ and $\Delta U7$ are determined immediately.

Figure 13A:
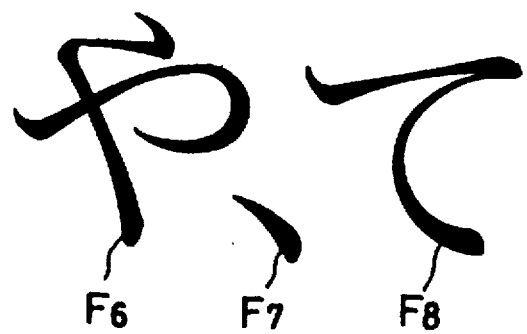
FIGS. 13A and 13B are explanatory views of the second embodiment, showing the characters after a correction of the overlap.
Figure 13B:
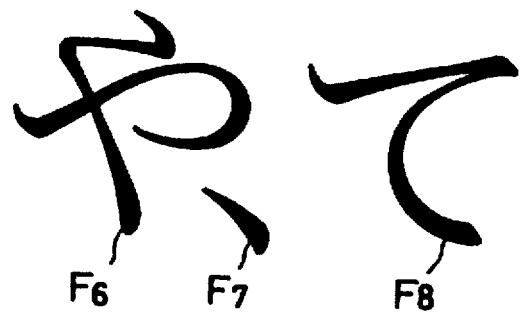

Steps S8 and S9:

After correcting the space reduction amounts U6 and U7 for the second and third characters M7 and M8 with the correction amounts $\Delta U6$ and $\Delta U7$ derived from the above equations, the kerning process is repeated for each character following the third character (S8), and the character string is outputted (S9), as in the first embodiment. FIG. 13B shows a character arrangement resulting from the kerning process in this embodiment, whereas FIG. 13A shows a character arrangement resulting from the kerning process in the first embodiment. In either process, the space between "や" and "て" equals the minimum facing space $r_1$. However, the difference in distribution of the correction amounts produces a slight difference between the corrected arrangements of the three characters. Whichever mode of distribution expected to be the more suitable may be determined in advance, or the two distribution modes may be offered for a selection to be made when desired.

Where vector font data is designed for positions suited to typesetting (i.e. character patterns are arranged properly), a ratio between front and rear spaces (left and right space widths) may be derived from font information or character patterns based on the font information. Where vector font data is not designed for positions suited to typesetting, the following step may be taken.

As shown in FIG. 14, a table is prepared in advance which includes characters classified according to position (center, right spaced or left spaced), and space widths (front space and rear space) recorded for respective character positions. When the second character M7 is not included in this table, correction amounts ΔU6 and ΔU7 are determined by the equal distribution mode in the first embodiment.

When the second character M7 is included in the table, correction amounts ΔU6 and ΔU7 are determined by the corresponding ratio of space widths recorded in the table. Although an additional memory capacity is needed for storing the table, the process is faster with elimination of the step of deriving space width ratios from font information or the like.

The present invention may be modified as set forth hereunder.

(1) The correction amounts ΔU6 and ΔU7 in the second embodiment may be determined based on a ratio between the space between bounding boxes BB6 and BB7, or the face frame space W67, and the space between bounding boxes BB7 and BB8, or the face frame space W78 (that is, a ratio between the overlapping amounts of the bounding boxes).

Thus, ΔU6: ΔU7=face frame space W67 : face frame space W78. In this case, AU6 and AU7 are expressed as follows:

$$\Delta U6 = [r_1 - (W7 + W67 + W78)] \times [(W67)/(W67 + W78)]$$

$$\Delta U7 = [r_1 - (W7 + W67 + W78)] \times [(W78)/(W67 + W78)]$$

Since the values in the right sides are all known, the values of ΔU6 and ΔU7 are determined immediately. According to this modification, the extents of overlapping between adjacent pairs of characters are taken into account in correcting the space reduction amounts. Thus, the correction is expected to produce an improved balance in the arrangement of characters. As is the equal distribution mode, this correcting mode is applicable to characters such as European characters having no space widths (i.e. the bounding boxes being the imaginary bodies also).

(2) The correction amounts ΔU6 and ΔU7 in the second embodiment may be determined by averaging correction amounts based on the ratio between front space $a_7$ and rear space $b_7$ (i.e. the ratio between left and right space widths) of the second character M7, and those based on the ratio between space W67 and space W78.

Thus, $$\Delta U6 = [r_1 - (W7 + W67 + W78)] \times$$
$$\{[(a_7)/(a_7+b_7)] + [(W67)/(W67 + W78)]\} \times$$
$$[1/2]$$

$$\Delta U7 = [r_1 - (W7 + W67 + W78)] \times$$
$$\{[(b_7)/(a_7+b_7)] + [(W78)/(W67 + W78)]\} \times$$
$$[1/2]$$

In this example, the extents of overlapping between adjacent pairs of characters and the space widths of the characters are taken into account in correcting the space reduction amounts. Thus, the correction is expected to produce an improved balance in the arrangement of characters.

(3) In a further modification, the ratio between ΔU6 and ΔU7 corresponds to the ratio between the first and second space reduction amounts U6 and U7. That is, ΔU6: ΔU7=first space reduction amount U6 : second space reduction amount U7

ΔU6 and ΔU7 based on the ratio between left and right space reduction amounts are expressed as follows:

$$\Delta U6 = [r_1 - (W7 + W67 + W78)] \times [(U6)/(U6+U7)]$$

$$\Delta U7 = [r_1 - (W7 + W67 + W78)] \times [(U7)/(U6+U7)]$$

Since the space reduction amounts include the space widths of adjacent characters, the correction based on these amounts is expected to produce a further improved balance in the arrangement of characters.

(4) The distribution of ΔU6 and ΔU7 in the second embodiment may be determined using a corresponding ratio between Q1 and Q2 recorded in advance for each character as shown in FIG. 15. For example, $$\Delta U6:\Delta U7=Q1:Q2$$

In this case, ΔU6 and ΔU7 are derived from the following equations:

$$\Delta U6 = [r_1 - (W7 + W67 + W78)] \times [(Q1)/(Q1+Q2)]$$

$$\Delta U7 = [r_1 - (W7 + W67 + W78)] \times [(Q2)/(Q1+Q2)]$$

Thus, the correction based on the appropriate ratios of Q1 and Q2 recorded in advance for the respective characters is expected to produce an improved balance in the arrangement of characters.

However, an additional memory capacity is needed for storing the ratios for the respective characters. In the modification (2) above, $a_7$ may be replaced with Q1, and $b_7$ with Q2.

(5) In the first and second embodiments, the first and second space reduction amounts are determined for the respective characters. Instead, the first and second space reduction amounts may be derived from a table, as shown in FIG. 16, of space reduction amounts recorded in advance for respective character pairs. Where space reduction amounts are recorded for respective character pairs in table form, the space reduction amounts in the table are not variable as desired. Normally, therefore, space reduction amounts tend to be small (i.e. to protrude only slightly into regions of adjacent characters) in order to avoid overlapping of characters.

However, the present invention can eliminate even an over-lapping of the first and third characters due to rather large space reduction amounts in such a table. According to the present invention, the space reduction amounts may be recorded in the table with a reduced limitation to their ranges.

(6) In the first and second embodiments, minimum facing spaces L1 and L2 and minimum facing spaces L6 and L7 are regarded as linear facing spaces between adjacent characters. As described hereinafter, a kerning process may be performed by regarding the minimum facing spaces as two-dimensional facing spaces between adjacent characters.

Figure 17A:
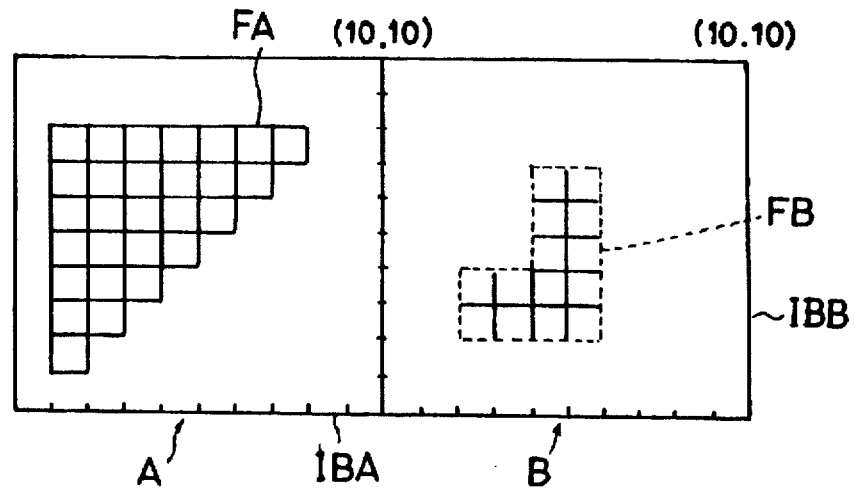
FIGS. 17A through 17C are explanatory views of a modified kerning process.
Figure 17B:
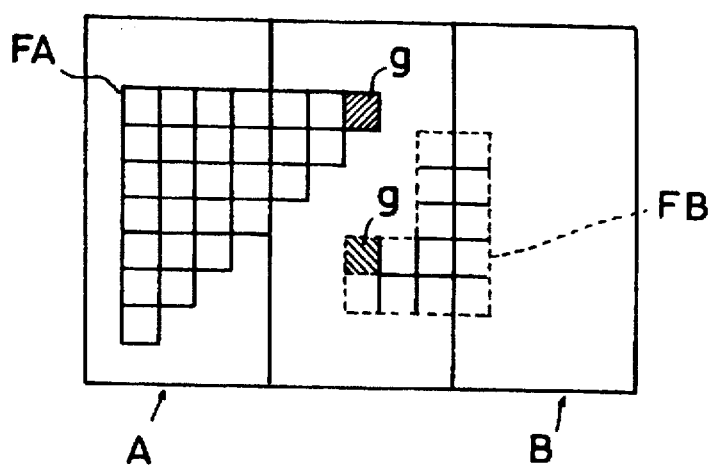
Figure 17C:
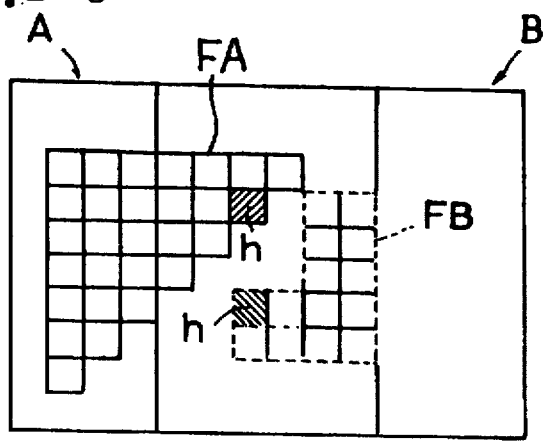
Figure 18:
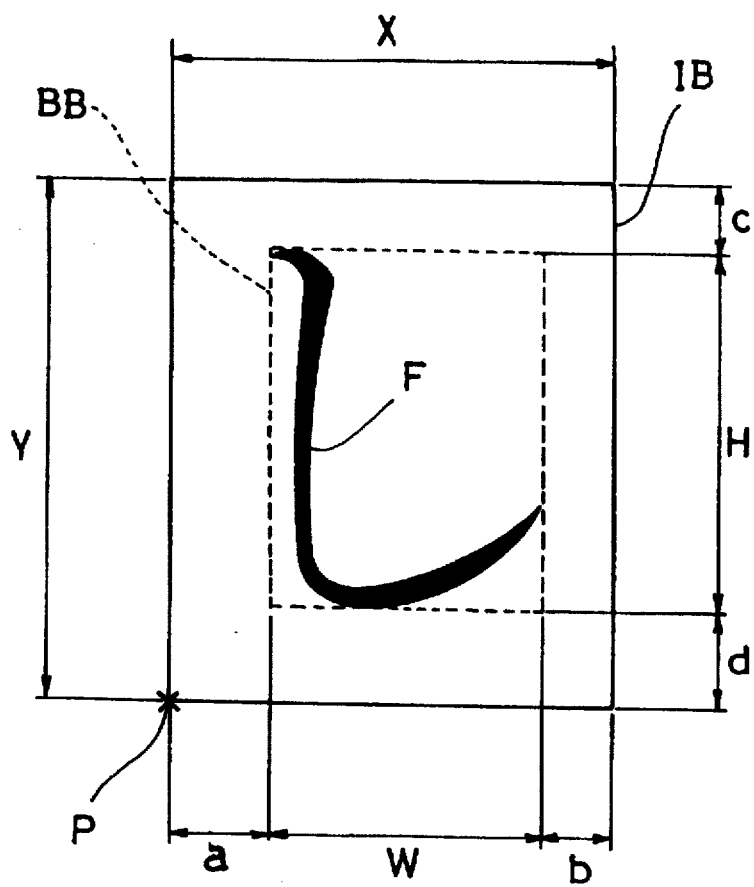
FIG. 18 is an explanatory view of a character makeup.

In placing an object character with a space reduction adjustment relative to an immediately preceding reference character, a minimum space between the faces of the reference character and object character is designated by a two-dimensional space (an amount of facing space). As shown in FIG. 17A, for example, dot pattern data B in 10×10 dots of the object character is prepared from vector data corresponding to a designated character size. Similarly, dot pattern data A in 10×10 dots of the reference character is prepared. The dot pattern data B of the object character is shifted dot by dot toward the dot pattern data A of the reference character. As shown in FIGS. 7B and 7C, a pair of dots (candidate point pair: (g, g) or (h, h)) providing a minimum space in each of the shifting direction (horizontal direction) and the direction perpendicular thereto (vertical direction) between faces FA and FB of the two dot pattern data A and B is determined at each shift. Space information in the shifting direction and space information in the direction perpendicular thereto are stored for the respective candidate pairs (g, g) and (h, h) when imaginary bodies IBA and IBB of the two characters contact each other (as in FIG. 17A).

From the position in which the imaginary bodies IBA and IBB of the two characters contact each other, the object character is shifted toward the reference character based on the space information in the shifting direction (horizontal direction), the space information in the direction perpendicular thereto (vertical direction), and the two-dimensional space designated. Space reduction amounts for the respective candidate point pairs (g, g) and (h, h) are computed until the respective candidate point pairs register with the two-dimensional space designated.

A minimum space reduction amount is determined among the space reduction amounts computed, and the object character is positioned with the minimum space reduction amount with respect to the reference character. Since the object character is positioned with the minimum space reduction amount with respect to the reference character, the faces do not overlap but the facing space may be set to the designated two-dimensional facing space. When the facing space is varied, space reductions are derived from the space information already stored and a newly designated facing space, without selecting candidate point pairs all over again.

After space reduction amounts are computed for the two-dimensional facing space between the two adjacent characters, computation of a facing space between the first and third characters and correction of the space reduction amounts may be performed in the same way as in the first or second embodiment. Thus, no inconvenience is encountered in applying the present invention to computation of space reduction amounts for two-dimensional facing spaces.

(7) In the first and second embodiments, the kerning process is performed for character strings arranged horizontally. The present invention is equally applicable to a kerning process where character strings are arranged vertically.

The present invention may be embodied in other specific forms without departing from the spirit or essential attributes thereof and, accordingly, reference should be made to the appended claims, rather than to the foregoing specification, as indicating the scope of the invention.

What is claimed is:

1. A kerning method of adjusting position of at least three characters each defined by an imaginary character frame including a face which represents a configuration of a character therein, said method comprising:

a character arranging step for arranging a first character, a second character and a third character in this order;

a space reducing step for reducing a first space between said first and second characters by a first space reduction amount and a second space between said second and third characters by a second space reduction amount;

a character space computing step for computing a third space between said first character and said third character;

a character space judging step for judging whether said third space is smaller than a reference space; and a space reduction correcting step for correcting at least one of said first space reduction amount and said second space reduction amount when said third space is smaller than said reference space, so that said third space is not smaller than said reference space.

2. A kerning method as defined in claim 1, wherein said third space is defined by a space between face frames of said first character and said third character, said face frames surrounding outermost configurations of the faces.

3. A kerning method as defined in claim 2, said character space computing step comprising the steps of:

obtaining a first face frame space between said face frames of said first character and said second character;

obtaining a second face frame space between said face frames of said second character and said third character; and calculating said third space from said first face frame space, said second face frame space and a dimension of said face frame of said second character.

4. A kerning method as defined in claim 3, said space reduction correcting step comprising the step of:

correcting said first space reduction amount and said second space reduction amount by correction amounts in a predetermined distribution.

5. A kerning method as defined in claim 4, wherein said first and second space reduction amounts are corrected by an equal correction amount.

6. A kerning method as defined in claim 4, wherein said first and second space reduction amounts are corrected by correction amounts corresponding to a ratio between said first face frame space and said second face frame space.

7. A kerning method as defined in claim 4, wherein said first and second space reduction amounts are corrected by correction amounts corresponding to a ratio between said first space reduction amount and said second space reduction amount.

8. A kerning method as defined in claim 3, wherein said space reduction amounts corresponding to specific pairs of the predetermined characters are stored in a table in advance, said space reducing step comprising the steps of:

obtaining said first space reduction amount corresponding to the pair of said first and second characters from said table if the pair of said first and second characters are one of said specific pairs; and obtaining said second space reduction amount corresponding to the pair of said second and third characters from said table if the pair of said second and third characters are one of said specific pairs.

9. A kerning method as defined in claim 8, said space reduction correcting step comprising the step of:

correcting said first space reduction amount and said second space reduction amount by an equal correction amount.

10. A kerning method as defined in claim 8, said space reduction correcting step comprising the step of:

correcting said first space reduction amount and said second space reduction amount by correction amounts corresponding to a ratio between said first face frame space and said second face frame space.

11. A kerning method as defined in claim 8, said space reduction correcting step comprising the step of:

correcting said first space reduction amount and said second space reduction amount by correction amounts corresponding to a ratio between said first space reduction amount and said second space reduction amount.

12. An electronic typographic/editing apparatus having a function for positionally adjusting, with successive space reductions in a predetermined direction of arrangement, at least three characters each defined by a character frame including a face therein, said three characters having a first character, a second character and a third character arranged in this order, said apparatus comprising:

character string data input means for inputting character string data to be edited and including a font name, a character size and character codes;

character string data storage means for storing said character string data inputted;

facing space designating means for designating facing spaces between adjacent pairs of characters;

reference space designating means for designating a reference space between the first character and the third character of said three characters arranged with successive space reductions;

font storage means for storing font data of a group of characters;

character data processing means for fetching said font data from said font storage means by referring to said font name and said character codes among said character string data stored in said character string data storage means, and for converting said font data into character data corresponding to said character size among said character string data;

space reduction computing means, in arranging said characters based on said character data with positional adjustment, for computing a space reduction amount for each character regarded as an object character, relative to an immediately preceding one of said characters acting as a reference character, so that a facing space between said reference character and said object character agrees with said facing space designated by said facing space designating means;

character space computing means for computing a first to third character facing space between said first character and said third character from said character data converted, and a space reduction amount for said second character and a space reduction amount for said third character;

character space judging means for judging whether said first to third character facing space computed is smaller than said reference space;

space reduction correcting means for correcting at least one of said space reduction amount for said second character and said space reduction amount for said third character when said first to third character facing space is smaller than said reference space, so that said first to third character facing space becomes at least equal to said reference space; and display/output means for displaying an adjusted character string based on said character string data stored in said character string data storage means, and corrected space reduction amounts for said characters.

13. An electronic typographic/editing apparatus as defined in claim 12, wherein said space between said first character and said third character is a space between face frames surrounding outermost configurations of the respective faces thereof, said character space computing means comprising:

means for deriving a face frame space between said first character and said second character from said space reduction amount for said second character, a rear space width, rearwardly with respect to said predetermined direction of arrangement, between said character frame and said face frame of said first character, and a front space width, forwardly with respect to said predetermined direction of arrangement, between said character frame and said face frame of said second character;

means for deriving a face frame space between said second character and said third character from said space reduction amount for said third character, a rear space width, rearwardly with respect to said predetermined direction of arrangement, between said character frame and said face frame of said second character, and a front space width, forwardly with respect to said predetermined direction of arrangement, between said character frame and said face frame of said third character; and means for deriving said space between said first character and said third character from the two face frame spaces derived, and a dimension, in said predetermined direction of arrangement, of said face frame of said second character.

14. An electronic typographic/editing apparatus as defined in claim 13, wherein said space reduction correcting means is operable for correcting the space reduction amounts for said second character and said third character by an equal correction amount.

15. An electronic typographic/editing apparatus as defined in claim 13, wherein said space reduction correcting means is operable for correcting the space reduction amounts for said second character and said third character by correction amounts corresponding to a ratio between a face frame space between said first character and said second character, and a face frame space between said second character and said third character.

16. An electronic typographic/editing apparatus as defined in claim 13, wherein said space reduction correcting means is operable for correcting the space reduction amounts for said second character and said third character by correction amounts corresponding to a ratio between said space reduction amount for said second character and said space reduction amount for said third character.

* * * * *